Nov. 5, 1929.  J. E. ROGERS  1,734,500
HOUSEHOLD MOTOR WITH ATTACHMENTS THEREFOR
Filed April 8, 1925   3 Sheets-Sheet 1

Inventor
Joseph E. Rogers
By his Attorneys
Cooper, Kerr & Dunham

Nov. 5, 1929.  J. E. ROGERS  1,734,500

HOUSEHOLD MOTOR WITH ATTACHMENTS THEREFOR

Filed April 8, 1925   3 Sheets-Sheet 2

Inventor
Joseph E. Rogers
By his Attorneys
Cooper, Kerr & Dunham

Nov. 5, 1929.    J. E. ROGERS    1,734,500
HOUSEHOLD MOTOR WITH ATTACHMENTS THEREFOR
Filed April 8, 1925    3 Sheets-Sheet 3
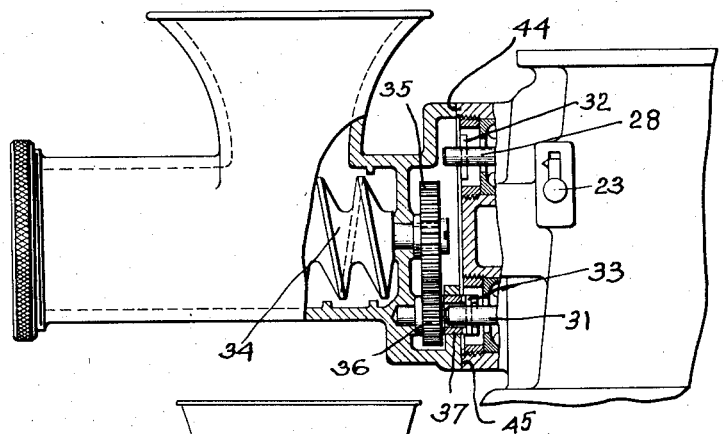
Fig. 5.
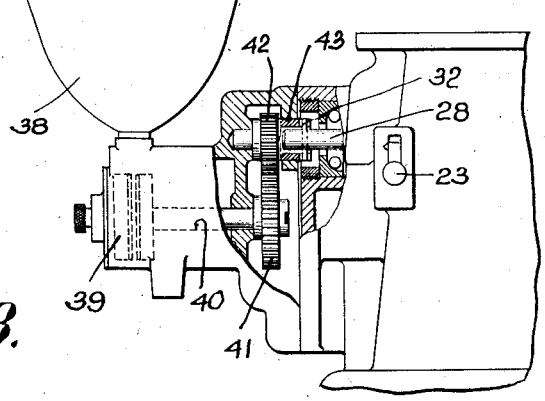
Fig. 6.
Fig. 8.
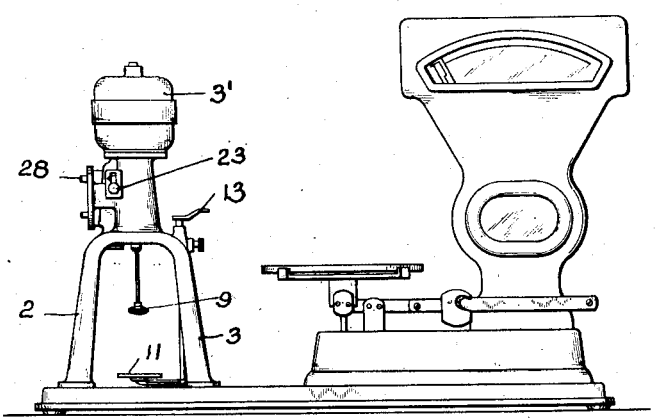
Inventor
Joseph E. Rogers
By his Attorneys
Cooper, Kerr & Dunham Patented Nov. 5, 1929

1,734,500

UNITED STATES PATENT OFFICE

JOSEPH E. ROGERS, OF MAMARONECK, NEW YORK, ASSIGNOR TO DAYTON SCALE COMPANY, OF DAYTON, OHIO, A CORPORATION OF NEW JERSEY

HOUSEHOLD MOTOR WITH ATTACHMENTS THEREFOR

Application filed April 8, 1925. Serial No. 21,577.

This invention relates to household appliances including a motor supporting stand having conveniently supported therein transmission means for driving various appliances which may be fastened to the stand for operation as desired.

At the present time there is a demand in households for labor-saving appliances, particularly for use in the kitchen. Occasion frequently arises for the driving of various appliances such as cake-mixers, egg-beaters, cream-whippers, coffee-grinders, meat-choppers, and the like. Such appliances, while readily driven electrically, have various operating characteristics such as the requirement of different speed and torque. The use of separate motors for such appliances is prohibitive on account of expense and nuisance and heretofore there has not been available any suitable power assembly and driving mechanisms having the necessary driving characteristics to enable all of the various household appliances to be operated.

The present invention has for one of its objects the provision of a simple and compact stand for supporting a small motor and power transmission elements suitable to transmit high speed or low speed rotation according to the requirements of the particular kitchen appliance that is to be used.

Another object is to provide a single mounting on the stand to which any one of a plurality of various kitchen or household appliances requiring different speeds of rotation may be connected for use.

Another object is the provision of various kitchen appliances each having therein connections for receiving the proper rate of rotation from the transmission elements mounted in a main supporting frame or stand so that it is only necessary for the user to secure it to the frame.

Other objects will be apparent from the specification and claims which follow, and in the accompanying drawings which, by way of illustration, show a preferred embodiment of the invention.

In the drawings:

Fig. 5 is a detail of the meat-chopper appliance attached in place on the main supporting frame.

Fig. 6 is a detail of a coffee-grinder appliance attached in place on the main supporting frame.

Fig. 8 is a general view showing the apparatus mounted on a base plate of a weighing scale.

Figures 1, 7:
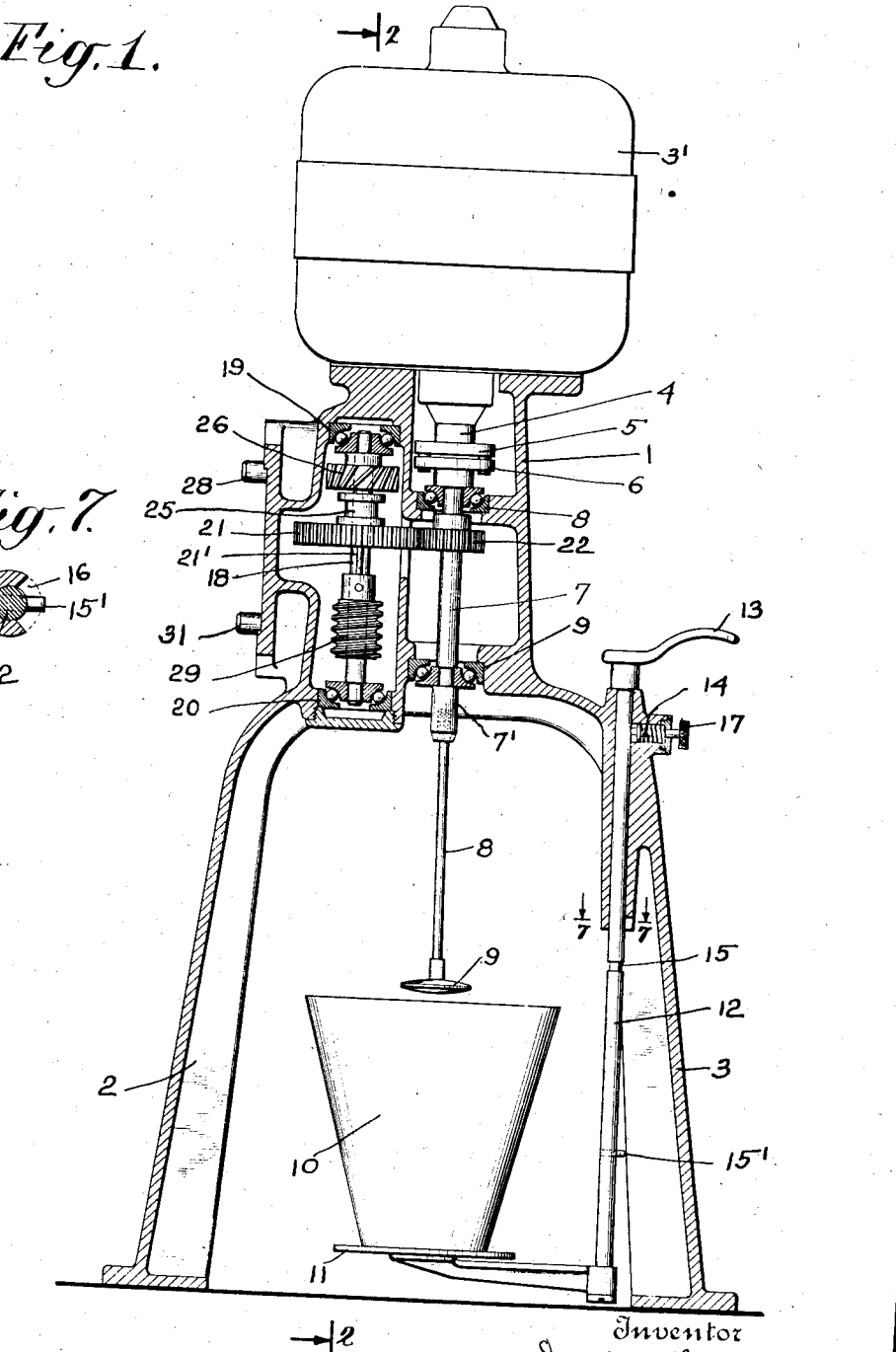
Fig. 1 is a front elevational view of the apparatus with a section taken through the supporting frame at its axis.
Fig. 7 is a detail taken on line 7—7 of Fig. 1.

Referring more in detail to the drawings, the main supporting frame consists of a casting having a hub-shaped box 1 at its upper end and a pair of legs 2, 3, at its lower end. These legs are sufficiently broad and heavy to maintain the entire assembly in a stable condition. Lips are provided at their feet should it be desirable to fasten the assembly in a permanent location. On top of this hub-shaped box is disposed a motor 3' having a rotor shaft 4 extending downwardly within the hub-shaped box. Rotor shaft 4 has attached thereto a coupling flange 5 to which is fastened a coupling flange 6 securely mounted on the upper end of main shaft 7. Main shaft 7 is mounted in bearings 8' and 9', carried by annular portions in the supporting frame. Fastened to the main shaft 7 by means of a threaded connection in socket 7' is a stirring rod 8 having a stirring disk 9 for whipping cream or beating eggs and other similar purposes. It is apparent that any other shape of tool may be inserted in the socket for accomplishing various other results.

The legs 2, 3 are of sufficient length to allow a receptacle 10 to be placed therebetween and underneath the end of the stirring rod 8. A table 11 is provided upon which the receptacle 10 is placed, and when it is desired to agitate the contents, this table is raised by means of a rod 12 to which is fastened a handle 13. Rod 12 runs through a journal in the main supporting frame and is maintained in its upper position by means of a spring pressed detent 14, which enters a groove 15 in the rod. In its raised position the lateral movement or swing of table 11 is limited by means of a pin 15' and sector 16 cut into the lower part of the journal of rod 12 (Fig. 7). This is desirable in order to prevent the stirring disk 9 from contacting the sides of the receptacle and causing damage or overturning. When it is desired to remove the receptacle 10, the spring pressed detent is withdrawn by means of a knob 17, and the table 11 is carefully lowered.

A counter-shaft 18 transmits power to drive kitchen appliances, for example, such as the meat-chopper or coffee-grinder, illustrated in Figs. 5 and 6. This counter-shaft is vertically mounted in bearings 19 and 20, set into the main frame structure and it receives its rotary motion by means of a gear 21, slidably mounted thereon and fixed to rotate therewith by a spline 21'. Gear 21 meshes with pinion 22, fixed to shaft 7. When rotation of shaft 18 is not desired, gear 21 is disengaged from pinion 22 by raising a handle 23. This handle operates a lever having a yoke 24 engaging a collar 25 fast to gear 21.

Figure 3:
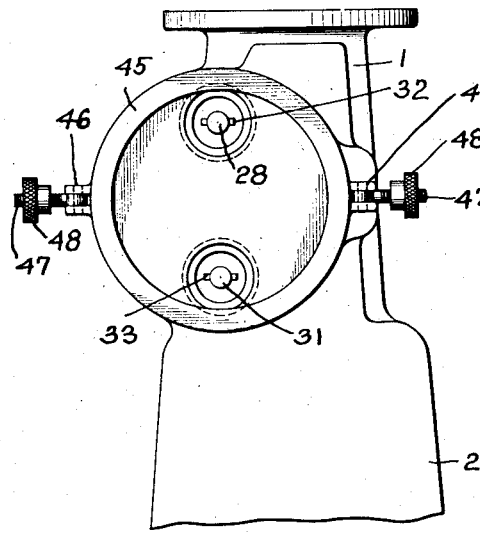
Fig. 3 is a detail of the mounting for the various kitchen appliances.
Figure 2:
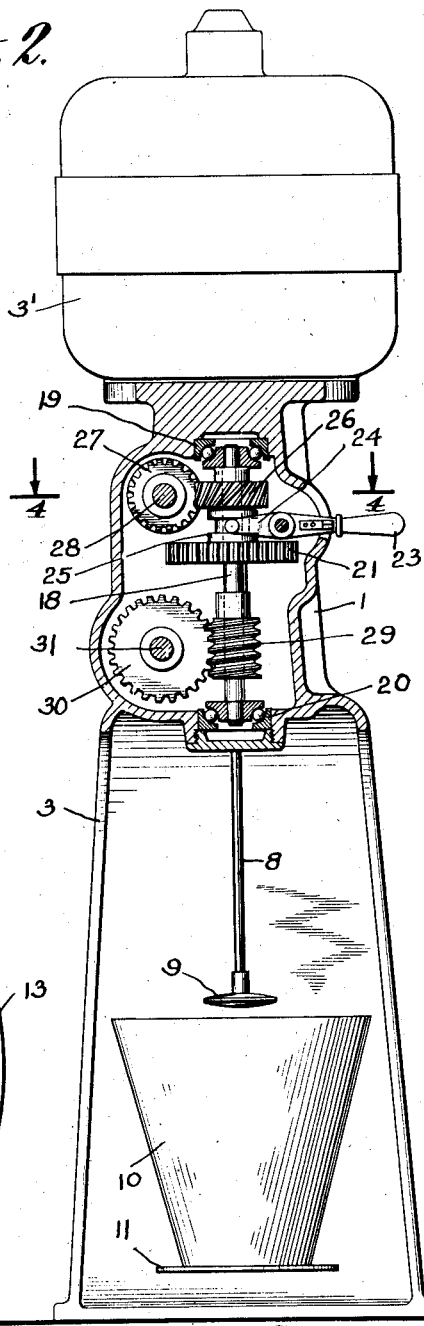
Fig. 2 is a side elevational view with a section taken on line 2—2, Fig. 1.
Figure 4:
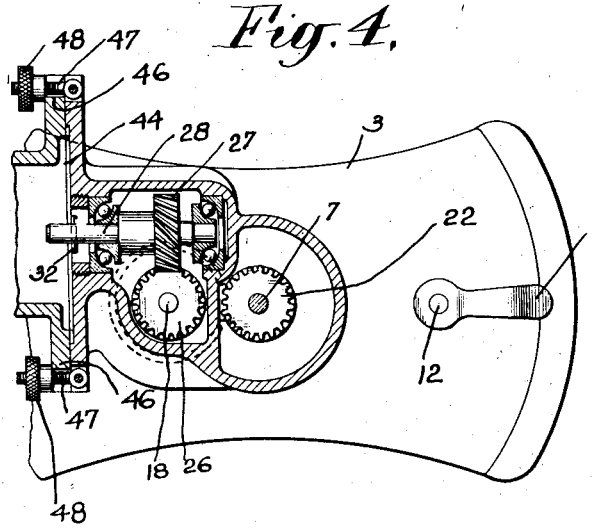
Fig. 4 is a cross-section of the transmission gearing of the high speed driving shaft taken on line 4—4, of Fig. 2.

Fixed to the upper part of counter-shaft 18 is a spiral gear 26 which engages another spiral gear 27 on shaft 28. Fixed to the lower end of counter-shaft 18 is a worm 29 which drives a worm wheel 30 fixed to a horizontal shaft 31. Shafts 28 and 31 are horizontally mounted one above the other (Figs. 2, 3 and 5) in bearings which are supported by the main frame casting. These bearings are designed similarly to those of the main and counter-shafts and screw caps are provided for their adjustment and replacement. At the ends of shafts 28 and 31 are pins 32 and 33, which are designed to engage in notches in collars of gears carried by the various kitchen appliances.

Shaft 28 may rotate at the same speed as counter-shaft 18 by having a one to one ratio of the spiral gears connecting them, but shaft 31 is designed to be driven at a much lower speed for driving appliances such as a meat-chopper which requires relatively low speed and much torque. These two shafts extend from the stand in close proximity to each other in order that the same mounting may be used to affix all appliances to the stand no matter from which of the two shafts they are to be driven.

The meat-chopper that I have chosen to illustrate (Fig. 5) is a self-contained structure having the usual meat-advancing screw 34 driven by gears 35 and 36. Gear 36 has a collar 37 having notches which engage the extremities of pin 33 on shaft 31 when the chopper is mounted in position on the stand for operation. The coffee-grinder is also a self-contained unit (Fig. 6) having a funnel 38 for holding the coffee beans and a grinder 39 mounted to rotate with shaft 40 which carries gear 41. Gear 41 is driven by pinion 42 which has a collar 43 integral therewith having notches for engaging the extremities of pin 32 on shaft 28.

Each of the kitchen appliances has a flange having an annular face 44, designed to contact face 45 on the main supporting structure. Slotted ears 46 extending from each side of the flange provide a means for securing the appliance firmly in place with face 44 contacting face 45. When one of these appliances is mounted into place screws 47 are pivoted on their pivots so that the screws will enter the slots in ears 46. Knurled nuts 48 are then tightened and the appliance is ready for use. It is apparent that any kitchen appliances requiring speeds somewhat approximating the speeds of the meat-chopper or coffee grinder may be attached to the main structure in a similar manner.

While the form of mechanism herein shown and described is admirably adapted to fulfill the objects previously stated, it is to be understood that it is not intended to confine the invention to the one form of embodiment herein disclosed, for it is susceptible of embodiment in various forms all coming within the scope of the claims which follow.

What I claim is:

1. A household power assembly comprising a stand, a driving motor supported thereon, a vertically disposed main shaft driven by said motor, a vertically disposed facing on said stand for mounting various appliances, a plurality of horizontal driving shafts journaled in said stand having their ends extending outside of the limits of said stand and within said facing, means on the ends of said latter shafts for connecting each of them separately to the drive means of said various appliances, a counter-shaft for driving said driving shafts at different speeds, and means for connecting and disconnecting said counter-shaft to said main shaft at will.

2. In apparatus of the kind described, a frame formed at the top with a supporting surface, an electric motor resting on said supporting surface, said frame being provided with an opening therethrough disposed below said motor, a spindle driven by said motor extending from said motor into said opening, a shaft for driving an instrumentality attached thereto said shaft being connected to said spindle and extending through and below said opening. and said frame being formed with means for adjustably mounting and carrying a support for an article holder in juxtaposition to said instrument.

3. In apparatus of the kind described, a frame formed at the top with a supporting surface, an electric motor resting on said surface, said frame being provided with an opening disposed below said motor, a shaft driven by said motor extending from said motor through and below said opening, said shaft being adapted to drive a food instrumentality connected thereto, a second distinct opening provided in said frame below said motor and communicating with said first-named opening, a second shaft rotatably mounted in said second opening, driving connections between said first and second shafts, said second shaft being adapted to drive a second food instrumentality, and means for at will disconnecting said first shaft from second shaft whereby the first instrumentality may be driven independently of said second instrumentality.

4. In a device of the class described, a frame, having a supporting surface at the top, a motor resting on said supporting surface, said frame being provided with an opening therethrough disposed below said surface, a shaft driven by said motor extending from said motor through said opening, said shaft being adapted to drive a food instrumentality, a second opening formed in said frame, a wall in said frame separating said openings, a second shaft rotatably mounted in said second opening, said second shaft being connected to a second food instrumentality, an elongated slot formed in the wall extending between said openings, gear connections between said shafts, said connections including a gear movable longitudinally of said slot to disconnect at will said first and second shafts whereby the first instrumentality may be driven independently of said second instrumentality.

5. As a subcombination, a unitary frame having a surface adapted to support a motor, said frame being provided with an opening therethrough disposed below said surface and communicating with said surface, said frame being provided with a second opening, a wall formed in said frame separating said openings, said wall being provided with a slot connecting said openings, supporting standards formed in said frame below said openings and adapted to support said frame, one of said standards being formed with means to carry a table below said openings.

6. As a subcombination, a unitary frame having a surface adapted to support a motor, said frame being provided with an opening therethrough disposed below said surface and communicating with said surface, said frame being provided with a second opening, a wall formed in said frame separating said openings, said wall being provided with a slot connecting said openings, and said frame having an exterior vertically extending wall closing said second opening and having passages formed therethrough extending into said second opening.

In testimony whereof I hereto affix my signature.

JOSEPH E. ROGERS.